(12) United States Patent
Xie et al.

(10) Patent No.: US 11,060,849 B2
(45) Date of Patent: Jul. 13, 2021

(54) DUAL-CHANNEL OPTICAL THREE-DIMENSIONAL INTERFERENCE METHOD AND SYSTEM BASED ON UNDERDETERMINED BLIND SOURCE SEPARATION

(71) Applicant: Guangdong University of Technology, Guangzhou (CN)

(72) Inventors: Shengli Xie, Guangzhou (CN); Kan Xie, Guangzhou (CN); Yanzhou Zhou, Guangzhou (CN); Haochuan Zhang, Guangzhou (CN)

(73) Assignee: GUANDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/875,017

(22) Filed: May 15, 2020

(65) Prior Publication Data
US 2020/0378756 A1 Dec. 3, 2020

(30) Foreign Application Priority Data
May 15, 2019 (CN) .......................... 201910400871.5

(51) Int. Cl.
*G01B 11/02* (2006.01)
*G01B 11/24* (2006.01)
(Continued)

(52) U.S. Cl.
CPC ...... *G01B 11/2441* (2013.01); *G01B 9/02004* (2013.01); *G01B 9/02044* (2013.01); *G01J 3/2823* (2013.01)

(58) Field of Classification Search
CPC ............ G01B 11/2441; G01B 9/02004; G01B 9/02044; G01B 9/02025; G01B 9/02083;
(Continued)

(56) References Cited

U.S. PATENT DOCUMENTS

2007/0009122 A1 1/2007 Hamacher

FOREIGN PATENT DOCUMENTS

CN 101727908 A 6/2010
CN 105354594 A 2/2016
(Continued)

OTHER PUBLICATIONS

Winter et al, MAP-Based Underdetermined Blind Source Separation of Convolutive Mixtures by Hierarchical Clustering and $\ell$-Norm Minimization, Hindawi Publishing Corporation, EURASIP Journal on Advances in Signal Processing, vol. 2007, Article ID 24717, 12 pages (Year: 2007).*
(Continued)

*Primary Examiner* — Tarifur R Chowdhury
*Assistant Examiner* — Jonathon Cook
(74) *Attorney, Agent, or Firm* — Leydig, Voit & Mayer, Ltd.

(57) ABSTRACT

The present disclosure discloses a dual-channel optical three-dimensional interference method based on underdetermined blind source separation, which blindly separates out, through interference data collected by a CCD camera, interference signals between surfaces of a slide under test, to solve interference signal parameters, including an interference signal amplitude-frequency and an interference signal phase-frequency. Based on a dual-channel optical three-dimensional Michelson-type interference experiment, estimation of a mixed matrix is obtained by a K-means clustering algorithm, and recovery of a source signal is achieved by a L1 norm shortest path method. It is finally achieved that laser wavenumber scanning can accurately and blindly separate out the interference signals of the four surfaces based on light intensity values collected by the CCD camera, to achieve the blind separation of the interference signals of the four surfaces.

2 Claims, 4 Drawing Sheets

(51) Int. Cl.
*G01B 9/02* (2006.01)
*G01J 3/28* (2006.01)

(58) Field of Classification Search
CPC .............. G01B 9/02084; G01J 3/2823; G01M 11/0271
See application file for complete search history.

(56) References Cited

FOREIGN PATENT DOCUMENTS

| CN | 105890538 A | 8/2016 |
|----|-------------|--------|
| CN | 108009584 A | 5/2018 |

OTHER PUBLICATIONS

Qingming, Blind source separation by weighted K-means clustering, Journal of Systems Engineering and Electronics, vol. 19, No. 5, 2008, pp. 882-887 (Year: 2008).*
First Office Action with English translation, dated Aug. 5, 2020, corresponding to Chinese Patent Application No. 201910400871.5, 11 pp.
First Search, dated Jul. 28, 2020, corresponding to Chinese Patent Application No. 201910400871.5, 3 pp.

* cited by examiner

DUAL-CHANNEL OPTICAL THREE-DIMENSIONAL INTERFERENCE METHOD AND SYSTEM BASED ON UNDERDETERMINED BLIND SOURCE SEPARATION

CROSS-REFERENCE TO RELATED APPLICATIONS

This application claims the benefit of and priority to Chinese Application Serial No. 2019104008715, filed May 14, 2019, which is hereby incorporated by reference in its entirety, to the extent not inconsistent herewith.

TECHNICAL FIELD

The present disclosure relates to the technical field of dual-channel laser wavenumber scanning three-dimensional Michelson-type interference, and in particular, to a dual-channel optical three-dimensional interference method and system based on underdetermined blind source separation.

BACKGROUND

Interference refers to the meeting and superposition of two coherent waves that satisfy certain conditions, and in a superposition area, the vibration of some points is always strengthened, and the vibration of some points is always weakened. The vibration intensity has a stable spatial distribution in an interference area. In measurements of various parameters, an interference measurement method has high test sensitivity, accuracy, and high-precision.

Blind source separation refers to a condition that when a source signal and a transmission channel process are unknown, the source signal is recovered only from an observed mixed signal, and when the number of observed signals is smaller than the number of source signals, it is underdetermined blind source separation.

In the related art, since the number of the observed signals is smaller than the number of the source signals, the source signals cannot be obtained in a form of an inverse matrix. If noise fluctuation is too strong while an amplitude of an interference signal is relatively small, then it is easy to make two considerably close interference signals overlap into one signal.

SUMMARY

An object of the present disclosure is to overcome the shortcomings and deficiencies in the related art and provide a dual-channel optical three-dimensional interference method based on underdetermined blind source separation. This method is based on a Michelson-type interferometer to make an interference reference light path and a measurement light path independent from each other, and provides a liquid crystal chip in the interference reference light path, thereby suppressing a light intensity of reference light.

Another object of the present disclosure is to provide a dual-channel optical three-dimensional interference system based on underdetermined blind source separation.

The object of the present disclosure is achieved by following technical solutions:

A dual-channel optical three-dimensional interference method based on underdetermined blind source separation, including following steps:

Step 1: issuing, by a computer, control instructions and performing linear frequency modulation on a wavenumber output of a semiconductor laser through a laser controller and a temperature control module;

where a linear frequency-modulation formula is:

$$k(t) = \frac{2\pi}{\left(\lambda_c - \frac{\Delta\lambda}{2}\right) + \frac{\Delta\lambda}{T} \cdot t}, t \in [0, T],$$

where $k(t)$ is a laser wavenumber, $\lambda_c$ is a wavelength at which the semiconductor laser is operating, $\Delta\lambda$ is a variation range of a laser output wavelength, and T is an end time corresponding to the laser output wavelength;

Step 2: collimating, by a first lens, laser output light into parallel light; splitting the parallel light into two beams of light by a beam splitter of a 50:50 cube, wherein the two beams of light includes one beam of light hitting two surfaces of a slide through a liquid crystal chip and the other beam of light hitting front and rear surfaces of an optical wedge, and scattered light beams on the two surfaces of the slide and scattered light beams on the front and rear surfaces of the optical wedge pass through the beam splitter again to form a return light path; concentrating, by a second lens, the return light path to a data acquisition card in a CCD camera and superimposing return light paths on each other in the data acquisition card to form an interference signal, wherein when coherent light emitted by the laser hits all surfaces under test, reflected light intensities on an upper surface of a channel are superimposed on each other to form an interference signal having $M(M-1)/2$ peaks, and since light intensities generated by the liquid crystal chip are different, the interference signal has different amplitude heights in the channel and thus is divided into two paths of interference signals $I_1$ and $I_2$;

where an interference signal formula of $I_1$ is:

$$I_1[x, y, k(t)] = \sum_{p=1}^{M} I_{1_p}(x, y) +$$

$$2\sum_{p=1}^{M-1} \sum_{q=p+1}^{M} \sqrt{I_{1p}(x, y) I_{1q}(x, y)} \cdot \cos[2k(t)\Lambda_{1pq}(x, y) + \varphi_{1_{pq0}}(x, y)],$$

wherein $\Lambda_{1pq}(x, y) = Z_{1pq}(x, y) \tau_{1pq}(x, y)$, $(x, y)$ represents space coordinates; subscripts p, q represent surfaces under test $S_p$ and $S_q$, respectively; $I_1$ represents reflected light intensity; $\Lambda_{1pq}$ represents a light distance difference between the surfaces under test $S_p$ and $S_q$; $Z_{1pq}$ represents a position difference between the surfaces under test $S_p$ and $S_q$ in a z direction; $\tau_{1pq}$ represents a light refractive index of a medium between the surfaces under test $S_p$ and $S_q$; and $\varphi_{1pq0}$ represents an initial phase difference between the surfaces under test $S_p$ and $S_q$;

A Fourier transform is performed on the formula for $I_1$ to obtain:

$$\tilde{I}_1(x, y, f) = \int_0^{\Delta k} I_1[x, y, k(t)] \cdot \exp$$

$$\{j2\pi f[k(t) - k_0]\} \cdot dk \otimes \int_0^{\Delta k} W[k(t)] \cdot \exp\{j2\pi f[k(t) - k_0]\}$$

$$dk \otimes \int_0^{\Delta k} \sum_{n=-\infty}^{\infty} \delta[k(t) - n_s \cdot Dk] \cdot \exp \cdot \{j2\pi f[k(t) - k_0]\} \cdot dk;$$

wherein an interference signal formula of $I_2$ is:

$$I_2[x, y, k(t)] = \sum_{p=1}^{M} I_{2p}(x, y) + 2\sum_{p=1}^{M-1} \sum_{q=p+1}^{M} \sqrt{I_{2p}(x, y)I_{2q}(x, y)} \cdot \cos[2k(t)\Lambda_{2pq}(x, y) + \varphi_{2pq0}(x, y)],$$

wherein $\Lambda_{2pq}(x, y) = Z_{2pq}(x, y)\tau_{2pq}(x, y)$, $(x, y)$ represents space coordinates; subscripts p and q represent surfaces under test $S_p$ and $S_q$, respectively; $I_2$ represents reflected light intensity; $\Lambda_{2pq}$ represents a light distance difference between the surfaces under test $S_p$ and $S_q$; $Z_{2pq}$ represents a position difference between the surfaces under test $S_p$ and $S_q$ in the z direction; $\tau_{2pg}$ represents a light refractive index of a medium between the surfaces under test $S_p$ and $S_q$; and $\varphi_{2pq0}$ represents an initial phase difference between the surfaces under test $S_p$ and $S_q$;

A Fourier transform is performed on the formula for $I_2$ to obtain:

$$\tilde{I}_2(x, y, f) = \int_0^{\Delta k} I_2[x, y, k(t)] \cdot \exp\{j2\pi f[k(t) - k_0]\} \cdot dk \otimes \int_0^{\Delta k} W[k(t)] \cdot \exp\{j2\pi f[k(t) - k_0]\} dk \otimes \int_0^{\Delta k} \sum_{n=-\infty}^{\infty} \delta[k(t) - n_s \cdot Dk] \cdot \exp \cdot \{j2\pi f[k(t) - k_0]\} \cdot dk;$$

wherein the amplitude-frequency characteristic that can be collected based on the interference signal $I_1$ has $M(M-1)/2$ peaks, each of which corresponds to an interference signal $S_{pq}$ of a surface of the slide under test and has an amplitude-frequency and a phase-frequency respectively denoted as $f_{1pq}$ and $\Phi_{1pq}$, and then a following formula is obtained:

$$f_{1pq}(x, y) = \frac{\Lambda_{1pq}(x, y)}{\pi},$$

$$\Phi_{1pq}(x, y) = 2k(1) \cdot \Lambda_{1pq}(x, y) + \varphi_{1pq0}(x, y);$$

whererin the amplitude-frequency characteristic that can be collected based on the interference signal $I_2$ has $M(M-1)/2$ peaks, each of which corresponds to an interference signal $S_{pq}$ of a surface of the slide under test and has an amplitude-frequency and a phase-frequency respectively denoted as $f_{2pq}$ and $\Phi_{2pq}$, and then a following formula is obtained:

$$f_{2pq}(x, y) = \frac{\Lambda_{2pq}(x, y)}{\pi},$$

$$\Phi_{2pq}(x, y) = 2k(1) \cdot \Lambda_{2pq}(x, y) + \varphi_{2pq0}(x, y);$$

wherein both the amplitude-frequencies $f_{1pq}$ and $f_{2pq}$ and the phase-frequencies $\Phi_{2pq}$ and $\Phi_{1pq}$ contain depth profile information of surfaces of the slide under test, by which $\Lambda_{pq}$ is be demodulated;

(x, y) in $I_1$ (x, y, k) and $I_2$ (x, y, k) are omitted, and since (x, y) keeps consistent throughout the process, division is performed only on k; k is in a time-domain, a signal is transformed into a frequency-domain by Fourier transform and replaced by f, to distinguish;

Step 3: performing fast Fourier transform (FFT) performed on the signal for transformation to the frequency-domain to form a sparse signal, since the underdetermined blind source separation requires the signal to be a sparse signal, but a time-domain light intensity signal does not satisfy sparseness;

wherein a K-means clustering method is used to estimate a mixed matrix A due to a number of observed signals I=2 being smaller than a number of source signals S=6;

a number of clusters is set as the number of the source signals, that is, K=S, the mixed matrix A estimated by the K-means clustering method is solved by:

(1) selecting k initial clustering centers from the M(M−1)/2 peaks, and randomly dividing the M(M−1)/2 peaks into k categories;

(2) calculating an Euclidean distance of each peak signal to respective clustering centers, wherein a formula for the Euclidean distance is:

$$d_i = \sqrt{(x_{1i} - x_0)^2 + (y_{2i} - y_0)^2} (i=1, \ldots, 6);$$

(3) ending the clustering if an error function no longer changes, wherein the error function is:

$$J(c_1, \ldots c_k) = \sum_{j=1}^{k} \sum_{xi(t) \in \psi(cj)} d(x_i(t), c_j)$$

$$(j = 1, \ldots, k),$$

where $\Psi(c_j)$ represents a set of column vectors with $c_j$ as a center, $d(x_i(t), c_j)$ represents the Euclidean distance between each sampled signal point $x_i(t)$ and the center $c_j$ of clustering, and when and only when $dc_j(x_i(t), c_j) = \min\{d(x_i(t), c_p), p=1, \ldots, k\}$, the error function obtains an optimal solution;

Step 4: performing fast Fourier transform (FFT) on the source signals to make the source signals satisfy the sparseness in a transformed frequency-domain, since the source signals do not satisfy the requirements of a sparseness in the time-domain, so that the blind source separation is performed in the transformed frequency-domain, and the transformed $I_1(k)$ and $I_2(k)$ satisfy the frequency-domain as:

$$\hat{I}(f) = A \cdot \hat{S}(f),$$

wherein $\hat{I}(f)$ represents an observation experiment result of the $I_1(f)$ and $I_2(f)$ in the frequency-domain; $\hat{S}(f)$ represents a peak of the amplitude-frequency in the $I_1(f)$ and $I_2(f)$ interference light intensity, and the number S is 6; then six paths of source signals is separated out from two paths of the observed signals, and the number of the observed signals is smaller than the number of the source signals; A is an unknown 2×6 mixed matrix; both A and S(f) are unknown and the mixed matrix A is irreversible;

the observed signal vector $\hat{I}(f)$ is expanded in the amplitude-frequency to obtain a matrix:

$$\begin{pmatrix} I_1(f) \\ I_2(f) \end{pmatrix} = \begin{pmatrix} a_{11}, a_{12}, a_{13}, a_{14}, a_{15}, a_{16} \\ a_{21}, a_{22}, a_{23}, a_{24}, a_{25}, a_{26} \end{pmatrix} \begin{pmatrix} S_1(f) \\ S_2(f) \\ S_3(f) \\ S_4(f) \\ S_5(f) \\ S_6(f) \end{pmatrix};$$

only one signal has a relatively large amplitude-frequency at a certain frequency based on a sparse theory; if at $f_1=1, \ldots, 1024$, only a value of $S_1(f_1)$ is relatively large, then based on the above formula, there is:

(1) $I_1(f_1)=a_{11}S_1(f_1)$, $I_2(f_2)=a_{21}S_1(f_1)$, a division is performed to obtain $I^2(f_1)/I_1(f_1)=a_{21}/a_{11}$, and thus on an amplitude-frequency diagram of the observed signal $S_1(f_1)$, points having the value of $S_1(f_1)$ are all gathered around a straight line having a slope of $a_{21}/a_{11}$;

(2) similarly, when the amplitudes of $S_2(f_i)$, $S_3(f_i)$, $S_4(f_i)$, $S_5(f_i)$, and $S_6(f_i)$ are relatively large, points are all gathered around straight lines having slopes of $a_{22}/a_{12}$, $a_{23}/a_{13}$, $a_{24}/a_{14}$, $a_{25}/a_{15}$, $a_{26}/a_{16}$, respectively;

$\sin\theta$ and $\cos\theta$ are obtained based on a value of a slope $\tan\theta$ of each of the six straight lines, and respective column vectors of the mixed matrix is obtained by performing clustering division on data points of the observed signals, that is, $$\begin{bmatrix} \sin\theta \\ \cos\theta \end{bmatrix}$$

is a column vector in the solved matrix A;

Step 5: recovering the source signals by minimizing a L1 norm shortest path after the mixed matrix A is estimated based on the K-means clustering method, wherein an operation principle is to, by decomposing each of the observed signals, find a linear combination closest to an observed signal vector and take it as an estimate of the source signal, and base vectors of some sources are extracted to recover the source signal with a minimum interference; this method first calculates, based on a direction in which the observed signal is located, differences between the direction and directions represented by the column vectors in the mixed matrix, sets some thresholds, and selects a plurality of representative directions having relatively small differences as potential directions for observed signal decomposition;

based on an a priori assumption of the source signals, when the source signals satisfy a sparse distribution, most of time there is a path of one of the source signals from an origin to $\hat{I}(f)$;

based on a matrix form of a model of the underdetermined blind source separation, the observed signal vector $\hat{I}(f)$ is known, wherein $\hat{I}(f)$ includes $I_1(f)$ and $I_2(f)$ and is linearly combined with base vectors $a_{ij}$ (i=1,2) (j=1, 2, 3, 4, 5, 6), and combination coefficients of the linear combination are respectively the source signals $S_1(f), S_2(f), \ldots, S_6(f)$; $\hat{I}(f)$ and $a_{ij}s_K(f)$ (K=1, 2, 3, 4, 5, 6) are connected end to end to form a closed geometry, and a sum of lengths of all the vectors $a_{ij}s_K(f)$ is a sum $$\sum_{k=1}^{6} |s_k(f)|$$

of absolute values of coefficients of $\hat{I}(f)$, and a solution of a minimum value $$\sum_{k=1}^{6} |s_k(f)|$$

is a shortest path of $\hat{I}(f)$ in all feasible solutions; and after estimating of the mixed matrix, based on a maximum posterior method and any given $\hat{I}(f)=A \cdot \hat{S}(f)$, there is always $$\hat{S}(f) = \min\sum_{k=1}^{6} |s_k(f)|,$$

and in this case the source signal is recovered and converted to the L1 norm minimum path, so as to estimate the source signal S;

an idea of parameter estimation based on least squares is to find an optimal parameter value of a function to be matched by minimizing a sum of squares of measurement errors;

Step 6: since both a real part and an imaginary part of an interference frequency-spectrum in an equation $$f_{pq}(x, y) = \frac{\Lambda_{pq}(x, y)}{\pi}$$

of $I_1$ and $I_2$ contain information of the light distance difference between the surfaces under test, applying a least square method to the real part and the imaginary part respectively, and an error equation E(x, y) constructed for an interference measurement frequency spectrum in the frequency-domain is as follows:

$$E[X(x, y)] = \sum_{i}^{L} |\tilde{I}(x, y, f_i) - \tilde{I}_m(x, y, f_i)|^2,$$

wherein L is a number of Fourier transform frequency points; $\tilde{I}(x, y, f_i)$ is the interference measurement frequency spectrum and is obtained by performing Fourier transform on an interference signal captured by a CCD camera;

an interference phase and an interference amplitude is solved as:

$$\phi_{pq} = \arctan\left[\frac{\text{Im}(\beta_{pq})}{\text{Re}(\beta_{pq})}\right],$$

$$\sqrt{I_p I_q} = \sqrt{|\beta pq|},$$

an expression of a wavenumber-domain intensity of the interference signal $S_{pq}$ between the surfaces $S_p$ and $S_q$ is:

$$I_{pq}\left(\frac{n-1}{N-1} \cdot \Delta k\right) = \sqrt{|\beta_{pq}|} \cos$$

$$\left\{2\pi \frac{(N-1)\arctan[\text{Im}(\eta_{pq})/\text{Re}(\eta_{pq})]}{2\pi\Delta k} \cdot \frac{n-1}{N-1}\Delta k + \arctan\left[\frac{\text{Im}(\beta_{pq})}{\text{Re}(\beta_{pq})}\right]\right\},$$

a complex-domain linear least squares algorithm of the interference signal; the complex-domain linear least squares algorithm is performed on the interference signals collected by the CCD camera to automatically separate out the interference signals of the respective surfaces, to facilitate extraction of the interference signals of the slide; successful blind separation of the interference signals improves depth profile resolution and reduces a phase fluctuation error of a laser wavenumber scanning interference detection.

In an embodiment, the sparse signal in the Step 3 is a signal whose value of the amplitude-frequency at each of 1024 frequencies is close to zero and that has six obvious peaks having a relatively large amplitude-frequency; a dual-channel peak declines smoothly in most places except for the six obvious peaks, and the source signals are statistically independent from each other to meet requirements of sparseness, and most of time, at most a value of only one of the source signals is dominant.

A dual-channel optical three-dimensional interference system based on underdetermined blind source separation, including a semiconductor laser, a laser controller, a temperature control module, an optical wedge, a CCD camera, a beam splitter, a computer, a liquid crystal chip, a first lens, a second lens, and a slide;

wherein the computer issues control instructions to perform linear frequency-modulation on a wavenumber output of the semiconductor laser through the laser controller and the temperature control module; after the laser output light is collimated by the first lens into parallel light, the parallel light is split into two beams of light by the beam splitter of a 50:50 cube, one beam of the two beams of light hits two surfaces of the slide through the liquid crystal chip, and the other beam of the two beams of light hits front and rear surfaces of the optical wedge; scattered light beams on the two surfaces of the slide and scattered light beams on the front and rear surfaces of the optical wedge pass through the beam splitter of the 50:50 cube again to form a return light path, the return light path is concentrated by the second lens to a data acquisition card in the CCD camera and superimposed on each other in the data acquisition card to form an interference signal, and the interference signal is processed by a processor in the CCD camera to form an interference image and then transmitted to the computer and finally presented in a form of an image for analysis.

Compared with the related art, the present disclosure has following beneficial effects:

(1) With respect to a conventional interference measurement method which cannot accurately identify respective peak positions, the present disclosure uses dual-channel detection and sampling, to make it possible to detect, through the blind source separation, positions of the respective interference signals even if the signals are subjected to relatively strong noise;

(2) The present disclosure introduces the K-means clustering algorithm and the L1 norm minimum path algorithm to respectively solve the underdetermined matrix to achieve separation of the source signals;

(3) Since the underdetermined blind source separation requires the signal to be a sparse signal, but the time-domain light intensity signal does not satisfy sparseness, the present disclosure performs fast Fourier transform FFT on the signal for transformation to a frequency-domain to form a sparse signal;

(4) In the present disclosure, the observed signal I=2, that is, to provide favorable conditions for multi-channel underdetermined blind source separation; and (5) In order to solve the underdetermined blind source separation, the present disclosure first estimates the mixed matrix, and then recovers the source signal from the mixed matrix.

Reference signs in the accompany drawings are: 1. semiconductor laser; 2. laser controller; 3. temperature control module; 4. optical wedge; 5. CCD camera; 6. beam splitter; 7. computer; 8. liquid crystal chip; 9. lens L2; 10. lens L1; and 11. slide.

DESCRIPTION OF EMBODIMENTS

The present disclosure will be described in further detail below with reference to embodiments and the accompany drawings, but the embodiments of the present disclosure are not limited thereto.

Figure 1:
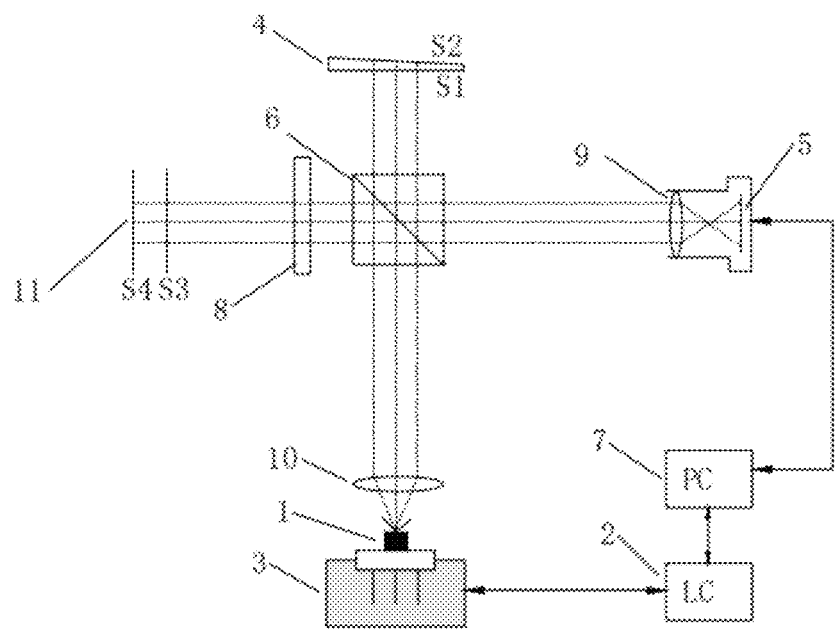
FIG. 1 is a schematic diagram of a dual-channel laser wavenumber scanning three-channel interference measurement system according to an embodiment of the present disclosure.

A dual-channel laser wavenumber scanning three-dimensional interference measurement system is provided in the present embodiment. As shown in FIG. 1, the system includes a semiconductor laser, a laser controller, a temperature control module, an optical wedge, a CCD camera, a beam splitter, a computer, a liquid crystal chip, a lens L1, a lens L2, and a slide.

A key component of an imaging light path in the present embodiment is the CCD camera. The CCD camera has a large dynamic range, a high resolution, and a fast response speed. Since an object-under-test of a slide type is greatly affected by an environment and a temperature, an indoor temperature should be kept constant and stable during an experiment.

The present embodiment provides a slide interference experiment. After determining conditions of the slide interference experiment, the slide interference experiment can be divided into two stages.

Figure 2:
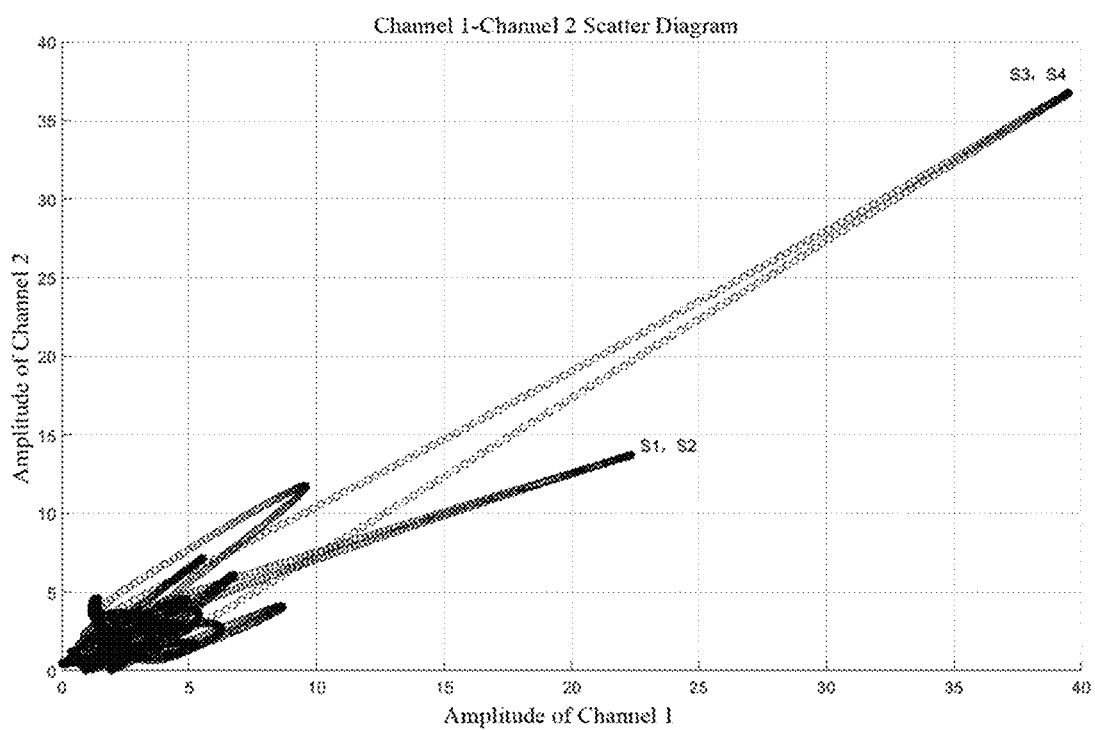
FIG. 2 is a scatter diagram of blind separation of a slide (S3, S4) and an optical wedge (S1, S2) according to an embodiment of the present disclosure.
Figure 3:
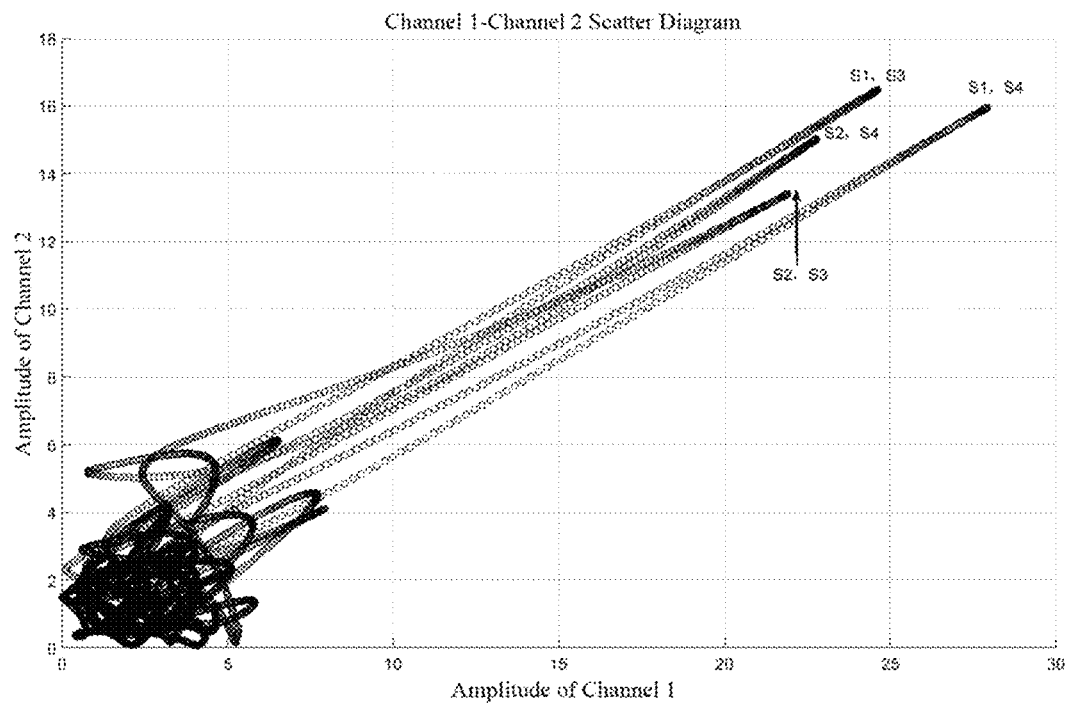
FIG. 3 is a scatter diagram of interference blind separation on front and rear surfaces of a slide and an optical wedge according to an embodiment of the present disclosure.

A first stage is a data acquisition stage, and a second stage is an amplitude-frequency and phase image cutting stage. For the first stage, the laser controller is turned on, a constant laser current mode is selected through the computer, and experimental parameters are set as a temperature control range: 28° C.-15° C., a temperature control current: 0.6 A, a laser current: 100 mA, an exposure time: 70000 µs, a sampling interval: 50 ms, and a number of samples: 500. In this way, data acquisition for the experiment is performed according to the above experimental parameters, and an interference fringe diagram can be observed during the acquisition process, as shown in FIG. 2.

For the second stage, after completing the sampling of the data in the first stage, a MATLAB program is used to execute horizontal image cutting, in which a behavior data packet is selected and saved and a data type is a short integer type; and a CZT transform and a Fourier transform are executed, in which there is no windowing operation in the Fourier transform and the Fourier transform is an interpolation Fourier transform.

The MATLAB program is used to execute the horizontal image cutting according to the above embodiment, and a principle thereof is to put the same row or the same column of a plurality of images in one mat file, facilitating image analysis and processing in the future. Since a change of a laser beam sequence is relevant to time t, the number of shots can be equated to the time t.

Another core of the present disclosure is laser wavenumber scanning interference detection. A light path of the laser wavenumber scanning interference detection is a Michelson-type interferometer based on a dual-channel light-splitting path.

The present embodiment is based on the Michelson-type interferometer, as shown in FIG. 1.

An object of the laser controller of the present embodiment is to linearly modulate the temperature, so as to achieve linear scanning of the laser wavenumber. An extremely high accuracy for the temperature control is required.

The experiment in which optical interference detection is performed on the object-under-test of the slide type based on the laser wavenumber scanning in the present embodiment shows that the interference fringe captured by the CCD camera can simply achieve blind separation of interference signals between surfaces of the object-under-test.

The problem of the blind separation of the interference signals in the present embodiment can be simplified as a superposition of 6 interference signals, which, when there are 4 surfaces in a depth z direction, lies in that based on both the slide and the optical wedge, there will be 6 interference signal superpositions, where one interference is one superposition. The interference signal between an interference reference surface and the slide under test is accurately extracted. According to the description, an appropriate distance between the surfaces under test is designed, to achieve useful interference signal separation.

An experimental principle of the present embodiment will be described as follows.

The computer issues control instructions to perform linear frequency modulation on the wavenumber output of the semiconductor laser through the laser controller and the temperature control module; after the laser output light is collimated by the lens L1 into parallel light, it is split into two beams of light by a beam splitter of a 50:50 cube, one beam of light hits two surfaces S3 and S4 of the slide through the liquid crystal chip, and the other beam of light hits front and rear surfaces S1 and S2 of the optical wedge. Scattered light beams on the two surfaces S3 and S4 of the slide and scattered light beams on the front and rear surfaces S1 and S2 of the optical wedge pass through the beam splitter of the 50:50 cube again to form a return light path. The return light path is concentrated by the lens L2 to a data acquisition card in the CCD camera and superimposed on each other in the data acquisition card to form an interference signal, which is processed by a processor in the CCD camera to form an interference image and then transmitted to the computer and finally presented in a form of an image for analysis.

In the experiment, when coherent light emitted by the laser hits the surfaces $S_1$, $S_2$, $S_3$, and $S_4$ under test, reflected light intensities on upper surfaces of the channels are superimposed on each other, to form an interference signal having 6 peaks.

The amplitude-frequency characteristic that can be collected based on the interference signal has 6 peaks, each peak corresponds to an interference signal $S_{pq}$ of the surface of the slide under test, and an amplitude-frequency and a phase-frequency at this peak are denoted as $f_{pq}$ and $\Phi_{pq}$, then a following formula is obtained:

$$f_{pq}(x,y) = \frac{\Lambda_{pq}(x,y)}{\pi}$$
$$\phi_{pq}(x,y) = 2k(1) \cdot \Lambda_{pq}(x,y) + \varphi_{pq0}(x,y).$$

In the present embodiment, the number of observed signals I=2 is smaller than the number of source signals S=6. Therefore, a K-means clustering method is used to estimate a mixed matrix A, and the interference signal is successfully separated out from the interference experiment of the surface of the slide under test.

The K-means clustering algorithm described in the present embodiment is to set the number of clusters to be equal to the number of the source signals, which is 6 in this experiment, so A is a 2*6 matrix. Fast Fourier transform (FFT) is applied to sparse the source signals, so that the signals are separate in a transformed frequency-domain, thereby obtaining a formula:

$$\hat{I}(f) = A \cdot \hat{S}(f).$$

Figure 4:
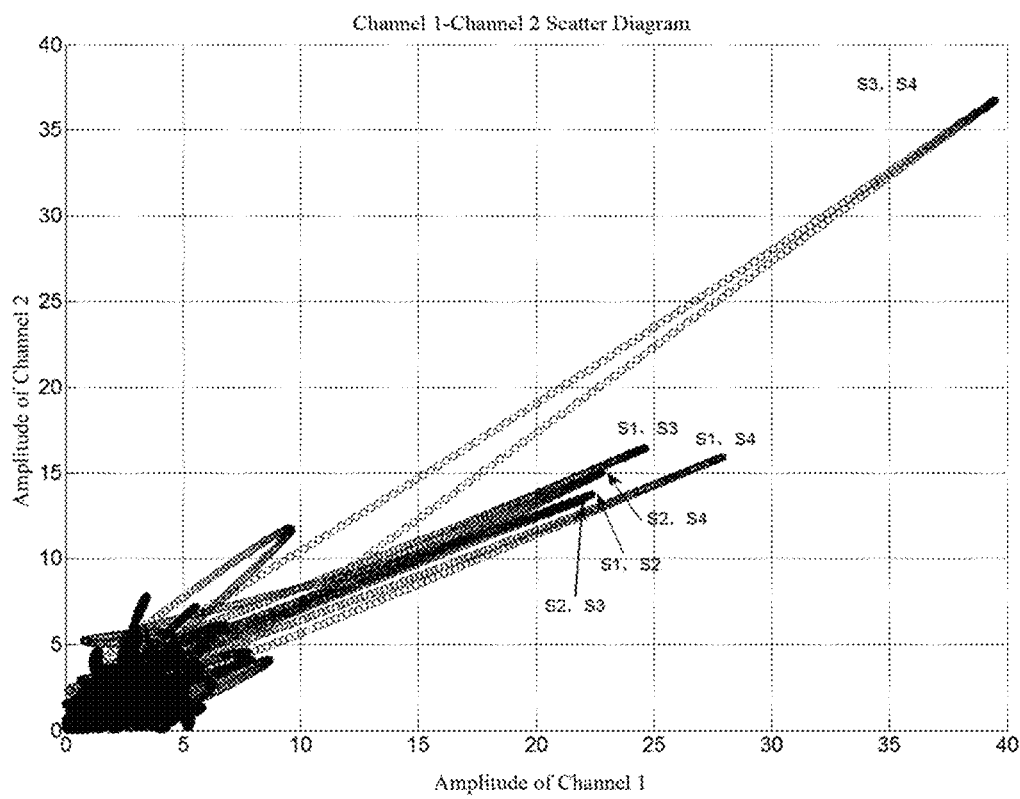
FIG. 4 is a scatter diagram of blind separation of 6 peaks according to an embodiment of the present disclosure.
Figure 5:
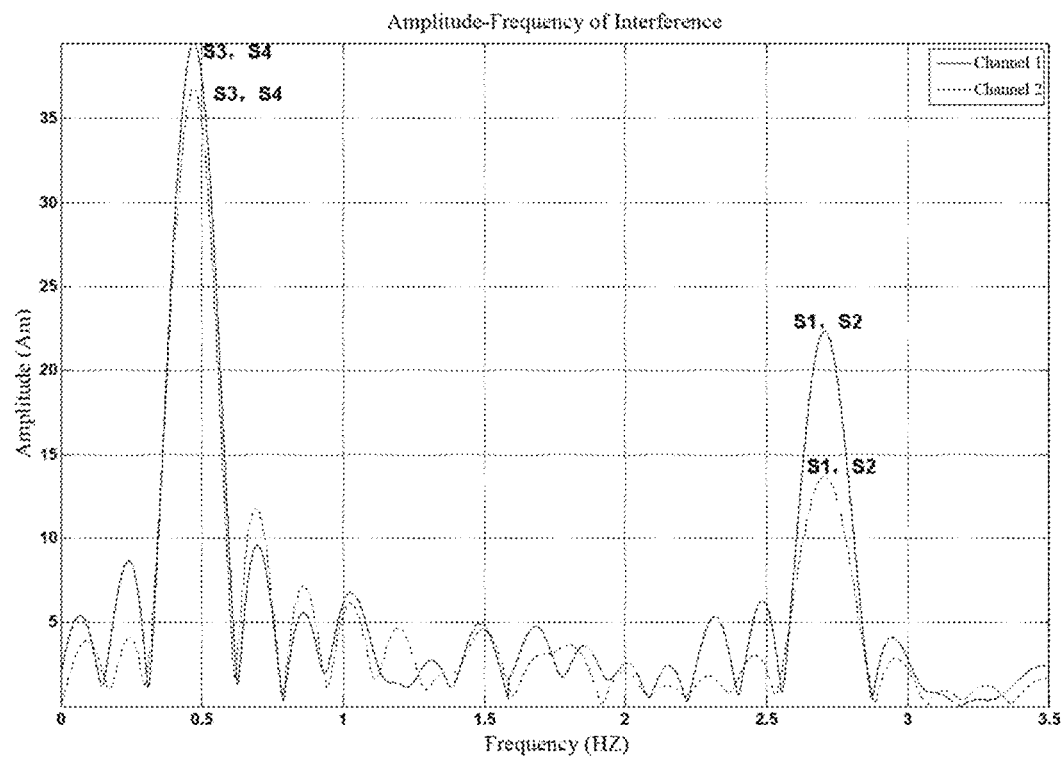
FIG. 5 is an amplitude-frequency interference diagram of a slide (S3, S4) and an optical wedge (S1, S2) according to an embodiment of the present disclosure.
Figure 6:
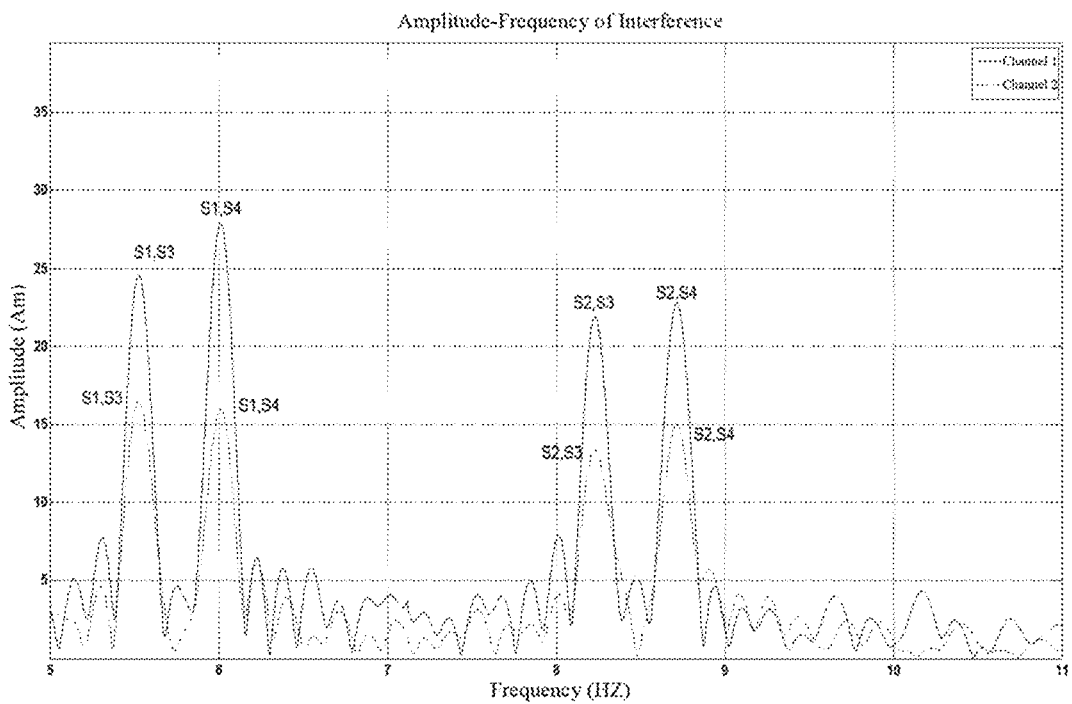
FIG. 6 is an interference amplitude-frequency diagram of front and rear surfaces of a slide and an optical wedge according to an embodiment of the present disclosure.
Figure 7:
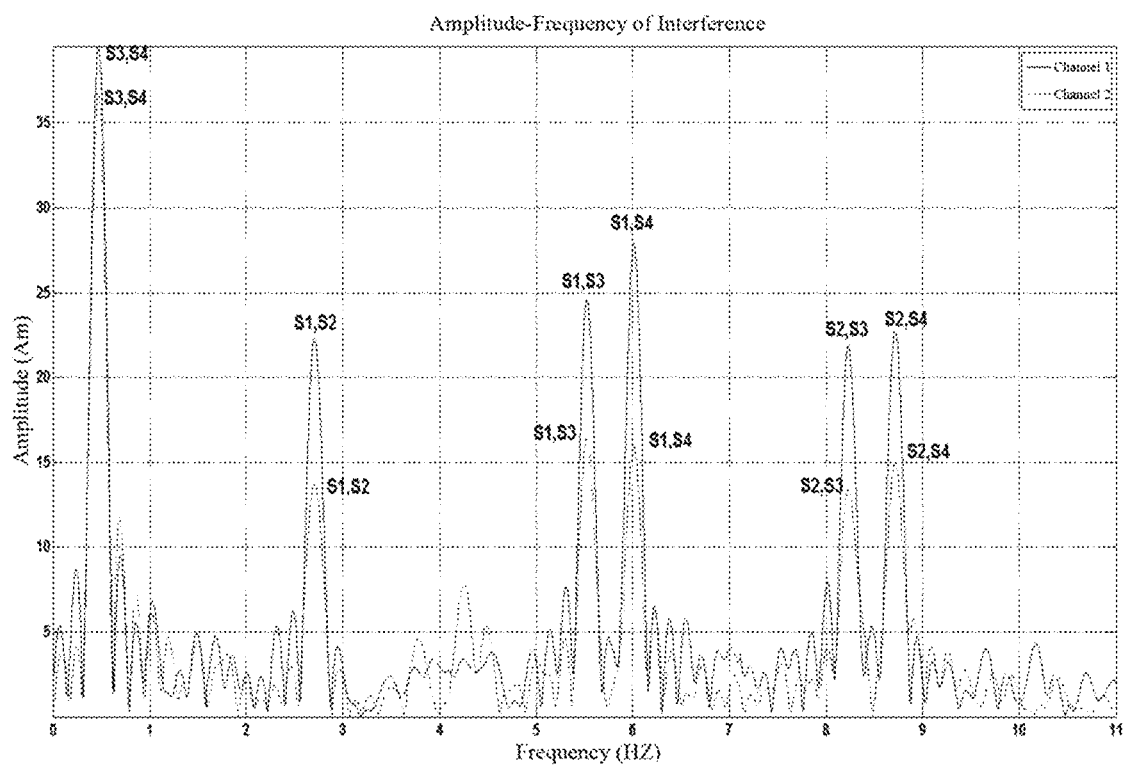
FIG. 7 is an amplitude-frequency interference diagram of 6 peaks according to an embodiment of the present disclosure.
Figure 8:
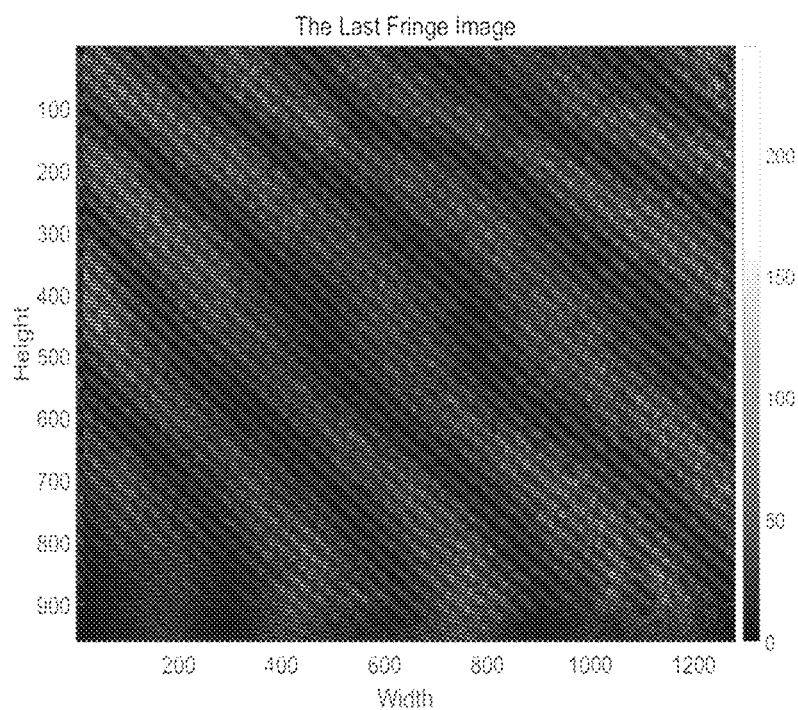
FIG. 8 is an interference fringe diagram according to an embodiment of the present disclosure.

An experimental process of the K-means clustering algorithm according to the present embodiment lies in:

(1) selecting 6 types of initial clustering centers from distribution data of 1024 scattered points, classifying other points closest to these 6 types of points into one type, and taking an average of all points of a current type as a center point, with reference to the scatter diagram FIG. 4;

(2) calculating Euclidean distances from the 6 peak signals to respective clustering centers, respectively, based on a formula for the Euclidean distance:

$$d_i = \sqrt{(y_{1i} - y_0)^2 + (y_{2i} - y_0)^2} (i=1, \ldots, 6),$$

where $y_{1i}$ is a y coordinate on a channel 1 and $y_{2i}$ is a y coordinate on a channel 2;

for the data results, reference can be made to the dual-channel interference amplitude-frequency diagram FIG. 7; and since the Euclidean distance is a distance to an origin, $y_0=0$, and it will be omitted uniformly in the following, then:

when $y_{11}=39.44, y_{21}=36.76, d_1=\sqrt{39.44^2+36.76^2}$;

when $y_{12}=22.33, y_{22}=13.72, d_2=\sqrt{22.33^2+13.72^2}$;

when $y_{13}=24.61, y_{23}=16.46, d_3=\sqrt{24.61^2+16.46^2}$;

when $y_{14}=27.89, y_{24}=15.94, d_4=\sqrt{27.89^2+15.94^2}$;

when $y_{15}=21.70, y_{25}=13.33, d_5=\sqrt{421.70^2+13.33^2}$; and when $y_{16}=22.76, y_{26}=15.00, d_6=\sqrt{22.76^2+15.00^2}$;

(3) if an error function no longer changes, the clustering ends.

The error function is:

$$J(c_1, \ldots c_6) = \sum_{j=1}^{6} \sum_{y_i(t) \in \psi(c_j)} d(y_i(t), c_j), (j=1, \ldots, 6).$$

After estimating the mixed matrix A based on the K-means clustering method, the source signal is recovered by a method of minimizing a L1 norm minimum path. An operation principle is to, by decomposing the observed signal, find a linear combination closest to an observed signal vector and use it as an estimate of the source signal, and base vectors of some sources are extracted to recover the source signal with the minimum interference. This method first calculates, based on a direction in which the observed signal is located, differences between it and directions represented by column vectors in the mixed matrix, sets some thresholds, and selects a plurality of representative directions having relatively small differences as potential directions for observed signal decomposition.

According to an a priori assumption of the source signals, when the source signals satisfy the sparse distribution, most of time there is a path of the source signal from the origin to $\hat{I}(f)$.

Based on $\hat{I}(f)=A \cdot \hat{S}(f)$, it can be seen that the vector $\hat{I}(f)$ of the observed signal can be linearly combined by base vectors $a_{ij}$ (i=1,2) (j=1, 2, 3, 4, 5, 6), whereas combination coefficients are the respective source signals $\hat{S}(f)$. $\hat{I}(f)$ and $a_{ij}s_K(f)$ (K=1, 2, 3, 4, 5, 6) are connected end to end to form a closed geometric shape, and a sum of lengths of all the vectors $a_{ij}s_K(f)$ is a sum $$\sum_{k=1}^{6} |s_k(f)|$$

of absolute values of their coefficients, so in all feasible solutions, a solution of the minimum value $$\sum_{k=1}^{6} |s_k(f)|$$

is a shortest path of $\hat{I}(f)$. Therefore, after estimating of the mixed matrix, according to a maximum posterior method and based on any given $\hat{I}(f)=A \cdot \hat{S}(f)$, there is always $$\hat{S}(k) = \min \sum_{k=1}^{6} |s_k(f)|,$$

and in this case the source signal recovery is converted to the L1 norm minimum path. Thus, the source signal S is estimated, and the blind source separation is achieved.

Both a real part and an imaginary part based on an interference frequency-spectrum contain information on a light distance difference between the surfaces under test. To simplify, following frequency numbers are all converted to a range of 0 to 1.5, so it can be known from the 6 peaks generated by the 4 surfaces that: a frequency $f_1$ corresponds to the front and rear surfaces $S_3$ and $S_4$ of the slide, a frequency $f_2$ corresponds to the front and rear surfaces $S_1$ and $S_2$ of the optical wedge, a frequency $f_3$ corresponds to the front surface $S_1$ of the optical wedge and the front surface $S_3$ of the slide, a frequency $f_4$ corresponds to the front surface $S_1$ of the optical wedge and the rear surface $S_4$ of the slide, a frequency $f_5$ corresponds to the rear surface $S_2$ of the optical wedge and the front surface $S_3$ of the slide, and a frequency $f_6$ corresponds to the rear surface $S_2$ of the optical wedge and the rear surface $S_4$ of the slide.

An experiment on the channel 1 has
$f_1$=0.470 Hz, $f_2$=2.704 Hz, $f_3$=5.523 Hz, $f_4$=6.014 Hz, $f_5$=8.241 Hz, $f_6$=8.718 Hz.

Then, a light distance difference can be solved as: $\Lambda_{1pq}(x, y)=\pi \cdot f_{1pq}(x, y)$.

Thus, a light distance difference between $S_3$ and $S_4$ is: $\Lambda_{34}$=3.14*0.470=1.476 mm,
a light distance difference between $S_1$ and $S_2$ is: $\Lambda_{12}$=3.14*2.704=8.491 mm,
a light distance difference between $S_1$ and $S_3$ is: $\Lambda_{13}$=3.14*5.523=17.342 mm,
a light distance difference between $S_1$ and $S_4$: $\Lambda_{14}$=3.14*6.014=18.884 mm,
a light distance difference between $S_2$ and $S_3$: $\Lambda_{23}$=3.14*8.241=25.877 mm, and
a light distance difference between $S_2$ and $S_4$: $\Lambda_{24}$=3.14*8.718=27.375 mm.

An experiment on the channel 2 has:
$f_1$=0.470 Hz, $f_2$=2.704 Hz, $f_3$=5.525 Hz, $f_4$=6.012 Hz, $f_5$=8.239 Hz, $f_6$=8.719 Hz A light distance difference can be solved as: $\Lambda_{2pq}(x, y)=\pi \cdot f_{2pq}(x, y)$mm.

Thus, a light distance difference between S3 and S4: $\Lambda_{34}$=3.14*0.470=1.476 mm,
a light distance difference between S1 and S2: $\Lambda_{12}$=3.14*2.704=8.491 mm,
a light distance difference between S1 and S3: $\Lambda_{13}$=3.14*5.525=17.348 mm,
a light distance difference between S1 and S4: $\Lambda_{14}$=3.14*6.012=18.878 mm,
a light distance difference between S2 and S3: $\Lambda_{23}$=3.14*8.239=25.870 mm, and
a light distance difference between S2 and S4: $\Lambda_{24}$=3.14*8.719=27.378 mm.

The principle of the Michelson-type interference in the present disclosure lies in that with an interference measurement system of laser wavenumber scanning dual-channel beam splitting path invisible laser light is collimated by a lens into parallel light and then split into two beams of coherent light by the beam splitter, including one beam of light directly hitting the optical wedge and one beam of light is radiated by the beam splitter to two surfaces of the slide under test, thereby causing an amplitude division interference. Then, the present disclosure estimates the mixed matrix by the K-means clustering algorithm and recovers the source signal by the L1 norm shortest path method. Under underdetermined conditions, when the mixed matrix is unknown and irreversible, the estimation of the mixed matrix is based on K-means clustering analysis.

With respect to the conventional interference measurement method which cannot accurately identify respective peak positions, the present disclosure uses dual-channel detection and sampling, to make it possible to detect, through the blind source separation, positions of the respective interference signals even if the signals are subjected to relatively strong noises; the K-means clustering algorithm and the L1 norm minimum path algorithm are introduced to respectively solve the underdetermined matrix to achieve separation of the source signals; since the underdetermined blind source separation requires the signal to be a sparse signal, but the time-domain light intensity signal does not satisfy sparseness, the present disclosure performs fast Fourier transform FFT on the signal for transformation to a frequency-domain to form a sparse signal; the observed signal I=2 provides favorable conditions for multi-channel underdetermined blind source separation; and in order to solve the underdetermined blind source separation, the mixed matrix is first estimated, and then the source signal is recovered from the mixed matrix.

The above descriptions relate to preferred embodiments of the present disclosure, but the embodiments of the present disclosure are not limited by the above descriptions. Any other changes, modifications, substitutions, combinations, and simplifications made without departing from the spirit and principle of the present disclosure shall be equivalent replacement methods and shall be included in the protection scope of the present disclosure.

What is claimed is:

1. A dual-channel optical three-dimensional interference method based on underdetermined blind source separation, comprising:

issuing, by a computer, control instructions and performing linear frequency modulation on a wavenumber output of a semiconductor laser through a laser controller and a temperature control module;

wherein a formula for the linear frequency modulation is:

$$k(t) = \frac{2\pi}{\left(\lambda_c - \frac{\Delta\lambda}{2}\right) + \frac{\Delta\lambda}{T} \cdot t}, t \in [0, T],$$

and wherein k(t) is a laser wavenumber, $\lambda_c$ is a wavelength at which the semiconductor laser is operating, $\Delta\lambda$ is a variation range of a laser output wavelength, and T is an end time corresponding to the laser output wavelength;

collimating, by a first lens, laser output light into parallel light; splitting the parallel light into two beams of light by a beam splitter of a 50:50 cube, wherein the two beams of light comprises one beam of light hitting two surfaces of a slide through a liquid crystal chip and the other beam of light hitting front and rear surfaces of an optical wedge, and scattered light beams on the two surfaces of the slide and scattered light beams on the front and rear surfaces of the optical wedge pass through the beam splitter again to form a return light path; concentrating, by a second lens, the return light path to a data acquisition card in a CCD camera and superimposing return light paths on each other in the data acquisition card to form an interference signal, wherein when coherent light emitted by the laser hits all surfaces under test, reflected light intensities on an upper surface of a channel are superimposed on each other to form an interference signal having M(M−1)/2 peaks, and since light intensities generated by the liquid crystal chip are different, the interference signal has different amplitude heights in the channel and thus is divided into two paths of interference signals $I_1$ and $I_2$;

wherein an interference signal formula for $I_1$ is:

$$I_1[x, y, k(t)] = \sum_{p=1}^{M} I_{1p}(x, y) + 2\sum_{p=1}^{M-1} \sum_{q=p+1}^{M} \sqrt{I_{1p}(x, y)I_{1q}(x, y)} \cdot \cos[2k(t)\Lambda_{1pq}(x, y) + \varphi_{1pq0}(x, y)],$$

wherein $\Lambda_{1pq}(x, y) = Z_{1pq}(x, y)\tau_{1pq}(x, y)$, (x, y) represents space coordinates; subscripts p, q represent surfaces under test $S_p$ and $S_q$, respectively; $I_1$ represents reflected light intensity; $\Lambda_{1pq}$ represents a light distance difference between the surfaces under test $S_p$ and $S_q$; $Z_{1pq}$ represents a position difference between the surfaces under test $S_p$ and $S_q$ in a z direction; $\tau_{1pq}$ represents a light refractive index of a medium between the surfaces under test $S_p$ and $S_q$; and $\varphi_{1pq0}$ represents an initial phase difference between the surfaces under test $S_p$ and $S_q$;

wherein a Fourier transform is performed on the formula for $I_1$ to obtain:

$$\tilde{I}_1(x, y, f) = \int_o^{\Delta k} I_1[x, y, k(t)] \cdot \exp\{j2\pi f[k(t) - k_0]\} \cdot dk \otimes \int_0^{\Delta k} W[k(t)] \cdot \exp\{j2\pi f[k(t) - k_0]\}$$

$$dk \otimes \int_o^{\Delta k} \sum_{n=-\infty}^{\infty} \delta[k(t) - n_s \cdot Dk] \cdot \exp\cdot\{j2\pi f[k(t) - k_0]\} \cdot dk,$$

wherein an interference signal formula for $I_2$ is:

$$I_2[x, y, k(t)] = \sum_{p=1}^{M} I_{2p}(x, y) + 2\sum_{p=1}^{M-1} \sum_{q=p+1}^{M} \sqrt{I_{2p}(x, y)I_{2q}(x, y)} \cdot \cos[2k(t)\Lambda_{2pq}(x, y) + \varphi_{2pq0}(x, y)],$$

wherein $\Lambda_{2pq}(x, y) = Z_{2pq}(x, y)\tau_{2pq}(x, y)$, (x, y) represents space coordinates; subscripts p and q represent surfaces under test $S_p$ and $S_q$, respectively; $I_2$ represents reflected light intensity; $\Lambda_{2pq}$ represents a light distance difference between the surfaces under test $S_p$ and $S_q$; $Z_{2pq}$ represents a position difference between the surfaces under test $S_p$ and $S_q$ in the z direction; $\tau_{2pq}$ represents a light refractive index of a medium between the surfaces under test $S_p$ and $S_q$; and $\varphi_{2pq0}$ represents an initial phase difference between the surfaces under test $S_p$ and $S_q$;

wherein a Fourier transform is performed on the formula for $I_2$ to obtain:

$$\tilde{I}_2(x, y, f) = \int_o^{\Delta k} I_2[x, y, k(t)] \cdot \exp\{j2\pi f[k(t) - k_0]\} \cdot dk \otimes \int_0^{\Delta k} W[k(t)] \cdot \exp\{j2\pi f[k(t) - k_0]\}$$

$$dk \otimes \int_o^{\Delta k} \sum_{n=-\infty}^{\infty} \delta[k(t) - n_s \cdot Dk] \cdot \exp\cdot\{j2\pi f[k(t) - k_0]\} \cdot dk;$$

wherein an amplitude-frequency characteristic that can be collected based on the interference signal $I_1$ has M(M−1)/2 peaks, each of which corresponds to an interference signal $S_{pq}$ of a surface of the slide under test and has an amplitude-frequency and a phase-frequency respectively denoted as $f_{1pq}$ and $\Phi_{1pq}$, and then a first formula is obtained:

$$f_{1pq}(x, y) = \frac{\Lambda_{1pq}(x, y)}{\pi},$$

$$\Phi_{1pq}(x, y) = 2k(1) \cdot \Lambda_{1pq}(x, y) + \varphi_{1pq0}(x, y);$$

wherein the amplitude-frequency characteristic that can be collected based on the interference signal $I_2$ has $M(M-1)/2$ peaks, each of which corresponds to an interference signal $S_{pq}$ of a surface of the slide under test and has an amplitude-frequency and a phase-frequency respectively denoted as $f_{2pq}$ and $\Phi_{2pq}$, and then a second formula is obtained:

$$f_{2pq}(x, y) = \frac{\Lambda_{2pq}(x, y)}{\pi},$$

$$\Phi_{2pq}(x,y) = 2k(l) \cdot \Lambda_{2pq}(x,y) + \varphi_{2pq0}(x,y);$$

wherein both the amplitude-frequencies $f_{1pq}$ and $f_{2pq}$ and the phase-frequencies $\Phi_{2pq}$ and $\Phi_{1pq}$ contain depth profile information of surfaces of the slide under test, by which $\Lambda_{pq}$ is be demodulated;

wherein (x, y) in $I_1$ (x, y, k) and $I_2$ (x, y, k) are omitted, and since (x, y) keeps consistent throughout the process, division is performed only on k; k is in a time-domain, a signal is transformed into a frequency-domain by Fourier transform and replaced by f;

performing fast Fourier transform (FFT) performed on the signal for transformation to the frequency-domain to form a sparse signal, since the underdetermined blind source separation requires the signal to be a sparse signal, but a time-domain light intensity signal does not satisfy sparseness;

wherein a K-means clustering method is used to estimate a mixed matrix A due to a number of observed signals I=2 being smaller than a number of source signals S=6;

wherein a number of clusters is set as the number of the source signals, that is, K=S, the mixed matrix A estimated by the K-means clustering method is solved by:

(1) selecting k initial clustering centers from the $M(M-1)/2$ peaks, and randomly dividing the $M(M-1)/2$ peaks into k categories;

(2) calculating an Euclidean distance of each peak signal to respective clustering centers, wherein a formula for the Euclidean distance is:

$$d_i = \sqrt{(x_{1i} - x_0)^2 + (y_{2i} - y_0)^2} (i=1, \ldots, 6);$$

(3) ending the clustering if an error function no longer changes, wherein the error function is:

$$J(c_1, \ldots c_k) = \sum_{j=1}^{k} \sum_{xi(t) \in \psi(cj)} d(x_i(t), c_j) \ (j = 1, \ldots, k),$$

wherein $\Psi(c_j)$ represents a set of column vectors with $c_j$ as a center, $d(x_i(t), c_j)$ represents the Euclidean distance between each sampled signal point $x_i(t)$ and the center $c_j$ of clustering, and when and only when $dc_j(x_i(t), c_j)=\min\{d(x_i(t), c_p), p=1, \ldots, k\}$, the error function obtains an optimal solution;

performing fast Fourier transform (FFT) on the source signals to make the source signals satisfy the sparseness in a transformed frequency-domain, since the source signals do not satisfy the requirements of a sparseness in the time-domain, so that the blind source separation is performed in the transformed frequency-domain, and the transformed $I_1(k)$ and $I_2(k)$ satisfy the frequency-domain as:

$$\hat{I}(f) = A \cdot \hat{S}(f),$$

wherein $\hat{I}(f)$ represents an observation experiment result of the $I_1(f)$ and $I_2(f)$ in the frequency-domain; $\hat{S}(f)$ represents a peak of the amplitude-frequency in the $I_1(f)$ and $I_2(f)$ interference light intensity, and the number S is 6; then six paths of source signals is separated out from two paths of the observed signals, and the number of the observed signals is smaller than the number of the source signals; A is an unknown 2×6 mixed matrix; both A and S(f) are unknown and the mixed matrix A is irreversible;

wherein the observed signal vector $\hat{I}(f)$ is expanded in the amplitude-frequency to obtain a matrix:

$$\begin{pmatrix} I_1(f) \\ I_2(f) \end{pmatrix} = \begin{pmatrix} a_{11}, a_{12}, a_{13}, a_{14}, a_{15}, a_{16} \\ a_{21}, a_{22}, a_{23}, a_{24}, a_{25}, a_{26} \end{pmatrix} \begin{pmatrix} S_1(f) \\ S_2(f) \\ S_3(f) \\ S_4(f) \\ S_5(f) \\ S_6(f) \end{pmatrix};$$

wherein only one signal has a relatively large amplitude-frequency at a certain frequency based a sparse theory; if at $f_1=1, \ldots, 1024$, only a value of $S_1(f_1)$ is relatively large, then based on the above formula, there is:

(1) $I_1(f_1)=a_{11}S_1(f_1)$, $I_2(f_2)=a_{21}S_1(f_1)$, a division is performed to obtain $I_2(f_1)/I_1(f_1)=a_{21}/a_{11}$, and on an amplitude-frequency diagram of the observed signal $S_1(f_1)$, points having the value of $S_1(f_1)$ are all gathered around a straight line having a slope of $a_{21}/a_{11}$;

(2) wherein when the amplitudes of $S_2(f_i)$, $S_3(f_i)$, $S_4(f_i)$, $S_5(f_i)$, and $S_6(f_i)$ are relatively large, points are all gathered around straight lines having slopes of $a_{22}/a_{12}$, $a_{23}/a_{13}$, $a_{24}/a_{14}$, $a_{25}/a_{15}$, $a_{26}/a_{16}$, respectively;

wherein sin θ and cos θ are obtained based on a value of a slope tan θ of each of the six straight lines, and respective column vectors of the mixed matrix is obtained by performing clustering division on data points of the observed signals, that is, $$\begin{bmatrix} \sin\theta \\ \cos\theta \end{bmatrix}$$

is a column vector in the solved matrix A;

recovering the source signals by minimizing a L1 norm shortest path after the mixed matrix A is estimated based on the K-means clustering method, wherein an operation principle is to, by decomposing each of the observed signals, find a linear combination closest to an observed signal vector and take it as an estimate of the source signal, and base vectors of some sources are extracted to recover the source signal with a minimum interference; this method first calculates, based on a direction in which the observed signal is located, differences between the direction and directions represented by the column vectors in the mixed matrix, sets some thresholds, and selects a plurality of representative directions having relatively small differences as potential directions for observed signal decomposition;

based on a priori assumption of the source signals, when the source signals satisfy a sparse distribution, most of the time there is a path of one of the source signals from an origin to $\hat{I}(f)$;

based on a matrix form of a model of the underdetermined blind source separation, the observed signal vector $\hat{I}(f)$ is known, wherein $\hat{I}(f)$ comprises $I_1(f)$ and $I_2(f)$ and is linearly combined with base vectors $a_{ij}$ (i=1,2) (j=1, 2, 3, 4, 5, 6), and combination coefficients of the linear combination are respectively the source signals $S_1(f)$, $S_2(f)$, ..., $S_6(f)$; $\hat{I}(f)$ and $a_{ij}s_K(f)$ (K=1, 2, 3, 4, 5, 6) are connected end to end to form a closed geometry, and a sum of lengths of all the vectors $a_{ij}s_K(f)$ is a sum $$\sum_{k=1}^{6} |s_k(f)|$$

of absolute values of coefficients of $\hat{I}(f)$, and a solution of a minimum value $$\sum_{k=1}^{6} |s_k(f)|$$

is a shortest path of $\hat{I}(f)$ in all feasible solutions; and after estimating of the mixed matrix, based on a maximum posterior method and any given $\hat{I}(f) = A \cdot \hat{S}(f)$, there is always $$\hat{S}(f) = \min \sum_{k=1}^{6} |s_k(f)|,$$

and the source signal is recovered and converted to the L1 norm minimum path, so as to estimate the source signal S;

wherein parameter estimation based on least squares is to find an optimal parameter value of a function to be matched by minimizing a sum of squares of measurement errors;

wherein since both a real part and an imaginary part of an interference frequency-spectrum in an equation $$f_{pq}(x, y) = \frac{\Lambda_{pq}(x, y)}{\pi}$$

of $I_1$ and $I_2$ contain information of the light distance difference between the surfaces under test, applying a least square method to the real part and the imaginary part respectively, and an error equation $E(x, y)$ constructed for an interference measurement frequency spectrum in the frequency-domain is as follows:

$$E[X(x, y)] = \sum_{i}^{L} |\tilde{I}(x, y, f_i) - \tilde{I}_m(x, y, f_i)|^2,$$

wherein L is a number of Fourier transform frequency points; $\tilde{I}(x, y, f_i)$ is the interference measurement frequency spectrum and is obtained by performing Fourier transform on an interference signal captured by a CCD camera;

wherein an interference phase and an interference amplitude is solved as:

$$\phi_{pq} = \arctan\left[\frac{\text{Im}(\beta_{pq})}{\text{Re}(\beta_{pq})}\right],$$

$$\sqrt{I_p I_q} = \sqrt{|\beta pq|},$$

wherein an expression of a wavenumber-domain intensity of the interference signal $S_{pq}$ between the surfaces $S_p$ and $S_q$ is:

$$I_{pq}\left(\frac{n-1}{N-1} \cdot \Delta k\right) = \sqrt{|\beta_{pq}|} \cos$$

$$\left\{2\pi \frac{(N-1)\arctan[\text{Im}(\eta_{pq})/\text{Re}(\eta_{pq})]}{2\pi \Delta k} \cdot \frac{n-1}{N-1} \Delta k + \arctan\left[\frac{\text{Im}(\beta_{pq})}{\text{Re}(\beta_{pq})}\right]\right\},$$

and a complex-domain linear least squares algorithm of the interference signal; the complex-domain linear least squares algorithm is performed on the interference signals collected by the CCD camera to automatically separate out the interference signals of the respective surfaces, to facilitate extraction of the interference signals of the slide; successful blind separation of the interference signals improves depth profile resolution and reduces a phase fluctuation error of a laser wavenumber scanning interference detection.

2. The dual-channel optical three-dimensional interference method based on the underdetermined blind source separation according to claim 1, wherein the sparse signal is a signal whose value of the amplitude-frequency at each of 1024 frequencies is close to zero and that has six obvious peaks having a relatively large amplitude-frequency; a dual-channel peak declines smoothly in most places except for the six obvious peaks, and the source signals are statistically independent from each other to meet requirements of sparseness, and at most a value of only one of the source signals is dominant.

* * * * *